United States Patent [19]

Stewart et al.

[11] Patent Number: 4,760,985

[45] Date of Patent: Aug. 2, 1988

[54] STRUT DISPENSER FOR ERECTING TRUSS STRUCTURES IN EXTRATERRESTRIAL SPACE

[75] Inventors: James P. Stewart, Cupertino; Herbert R. Beaven, Jr., Los Altos, both of Calif.

[73] Assignee: Lockheed Missiles & Space Company, Inc., Sunnyvale, Calif.

[21] Appl. No.: 940,678

[22] Filed: Dec. 11, 1986

[51] Int. Cl.$^4$ .............................................. F16M 11/00
[52] U.S. Cl. .................................... 248/176; 211/70.4; 211/60.1; 248/512; 248/535; 403/327
[58] Field of Search ...................... 248/176, 122, 200.1, 248/201, 512, 535; 211/70.4, 60.1; 403/327, 329

[56] References Cited

U.S. PATENT DOCUMENTS

| | | | |
|---|---|---|---|
| 2,258,960 | 10/1941 | Rymal | 211/70.4 |
| 2,781,185 | 2/1957 | Robbins | 211/70.4 X |
| 4,445,579 | 5/1984 | Bello | 211/70.4 X |
| 4,679,961 | 7/1987 | Stewart | 403/341 |

Primary Examiner—Ramon O. Ramirez
Attorney, Agent, or Firm—John J. Morrissey

[57] ABSTRACT

An apparatus (10) for dispensing struts (11 and 12) for use by an astronaut in erecting a truss structure in extraterrestrial space comprises a frame to which a platform (16) is attached. The astronaut anchors himself to the platform (16) while erecting the truss structure. Pairs of retainer assemblies for securing opposite ends of struts of different lengths, i.e., the pair of retainer assemblies (22 and 23) for the struts (11), and the pair of retainer assemblies (22' and 23') for the struts (12), are also attached to the frame. One retainer assembly (22 or 22') from each pair is positioned within the astronaut's reach when he is anchored to the platform (16), and the other retainer assembly (23 or 23') from each pair is positioned remote from the astronaut's reach. Each of the remote retainer assemblies (23 and 23') comprises a plurality of spring-loaded receptacles (41) for receiving one end of the corresponding struts (11 or 12). Each of the retainer assemblies (22 and 22') within the astronaut's reach comprises a plate having recesses (51) for receiving the other end of the corresponding struts (11 or 12). Putting a strut (11 or 12) into, or removing a strut (11 and 12) from, the apparatus (10) is accomplished by pushing the strut (11 or 12) against the bias of the corresponding spring-loaded receptacle (41), so that the end of the strut (11 or 12) received by the corresponding recess (51) is able to clear the retainer assembly (22 or 22').

11 Claims, 5 Drawing Sheets

FIG_1

FIG_9

FIG_8

FIG_13

STRUT DISPENSER FOR ERECTING TRUSS STRUCTURES IN EXTRATERRESTRIAL SPACE

TECHNICAL FIELD

This invention relates generally to the erection of truss structures, and more particularly to an apparatus for dispensing struts as needed in erecting a large-scale truss structure in extraterrestrial space.

BACKGROUND OF THE INVENTION

A technique for erecting a large-scale truss structure from a kit comprising a plurality of struts and nodal elements is described in U.S. Pat. No. 4,679,961 which is incorporated herein by reference.

Quick-connecting coupling fixtures of the type disclosed in U.S. Pat. No. 4,679,961 are of particular advantage to an astronaut in securing the ends of struts to the mating ends of lugs projecting from nodal elements, when erecting a large-scale truss structure in the weightless environment of extraterrestrial space. However, the speed with which an astronaut can erect a truss structure using such quick-connecting coupling fixtures to couple the struts and nodal elements together depends to a large extent upon the time required to maneuver each strut into suitable position with respect to each corresponding lug so that the quick-connecting coupling fixture for securing the strut to the lug can be activated.

The time and effort required to erect a truss structure in extraterrestrial space from struts and nodal elements as described in U.S. Pat. No. 4,679,961 could be minimized by using a dispenser from which the astronaut can obtain the struts and nodal elements in proper sequence as needed to erect the truss structure according to a predetermined construction plan.

SUMMARY OF THE INVENTION

The present invention provides an apparatus for storing and dispensing struts of the type disclosed in U.S. Pat. No. 4,679,961, particularly for application in erecting truss structures in extraterrestrial space.

A strut dispenser according to the present invention comprises a frame to which are attached: (1) a platform upon which an astronaut can anchor his feet while erecting the truss structure, and (2) a pair of strut-retainer assemblies adapted for retaining opposite ends of each one of a plurality of struts to which quick-connecting coupling fixtures of a type also disclosed in U.S. Pat. No. 4,679,961 are attached. A first one of the strut-retainer assemblies is attached to the frame at a location that is within easy reach of a work station at which the astronaut, while standing on the platform, can remove the struts in proper sequence and connect them to nodal elements in order to erect the truss structure. A second one of the strut-retainer assemblies is attached to the frame at a location remote from the astronaut's work station.

The strut-retainer assembly within reach of the astronaut's work station comprises a plate having a plurality of recesses on one surface thereof. Each recess in the strut-retainer plate is configured to receive a hemicylindrical distal end of the cylindrical member of a coupling fixture of the type disclosed in U.S. Pat. No. 4,679,961. The strut-retainer assembly remote from the astronaut's work station comprises an apertured plate that supports a plurality of spring-loaded receptacles. Each receptacle is likewise configured to receive a hemicylindrical distal end of the cylindrical member of a coupling fixture of the same type. Such coupling fixtures are attached, one at each end, to each one of the struts stored in the dispenser.

To remove a selected one of the struts from the dispenser, the astronaut uses one hand to grasp the coupling fixture that is attached to one end of the selected strut (i.e., the end of the selected strut within reach of his work station). With the one-hand grip on the coupling fixture, the astronaut then moves the selected strut longitudinally toward the strut-retainer assembly remote from his work station against a restoring force exerted by the spring-loaded receptacle holding the distal end of the cylindrical member of the coupling fixture attached to the opposite end of the strut.

While the distal end of the cylindrical member of the coupling fixture at the opposite end of the strut remains in the spring-loaded receptacle at the remote strut-retainer assembly, the astronaut lifts the distal end of the cylindrical member of the coupling fixture in his grasp out of the recess in the plate of the strut-retainer assembly within reach of his work station. The astronaut then pivots the strut about the spring-loaded receptacle so that the end of the strut that is attached to the coupling fixture in his grasp is thereby moved away from the dispenser. When the coupling fixture in his grasp is clear of the retainer assembly, the astronaut then pulls the strut so that the coupling fixture at the opposite end of the strut is withdrawn from the spring-loaded receptacle. The strut is thereby removed from the dispenser, and can be maneuvered with the same one-hand grip in the weightlessness of extraterrestrial space into position for connection to the corresponding lug projecting from the appropriate nodal element.

BEST MODE OF CARRYING OUT THE INVENTION

Figure 1:
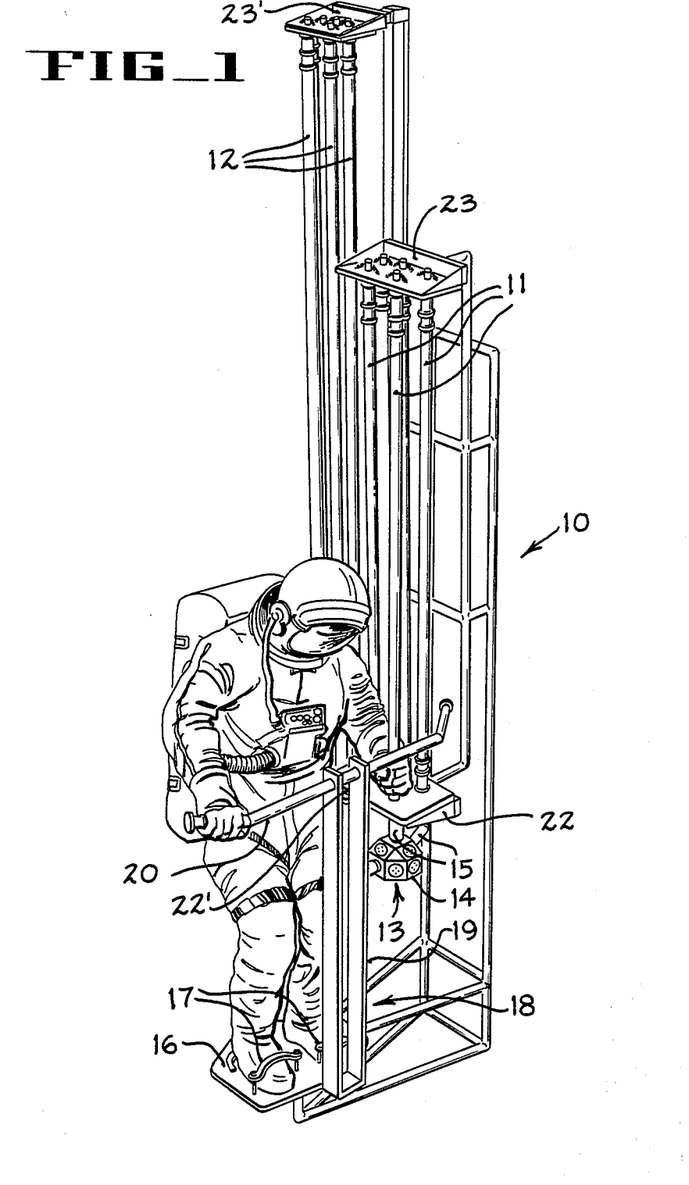
FIG. 1 is a perspective view of a prototype strut dispenser according to the present invention.

A prototype of a strut dispenser 10 according to the present invention is illustrated in FIG. 1. This prototype, substantially as shown in the drawing, was favorably evaluated by Lockheed Missiles & Space Company, Inc. in a test procedure that was conducted in a terrestrial environment in which the weightlessness of extraterrestrial space was simulated to some extent, i.e., the underwater environment of a swimming pool. However, the overall configuration of a strut dispenser that might be designed for use in erecting a particular kind of truss structure in extraterrestrial space could be quite different in certain respects from the configuration of the prototype illustrated in FIG. 1 without departing from the essence of the present invention.

The strut dispenser 10 shown in FIG. 1 is designed to store and dispense strut assemblies and node assemblies generally of the kind disclosed in U.S. Pat. No. 4,679,961. In the particular embodiment illustrated in FIG. 1, the strut dispenser 10 stores five struts 11 of a shorter length, and five struts 12 of a longer length. In principle, however, the strut dispenser 10 could be configured to store struts of any number of different lengths, and to store any number of struts of any particular length. The strut dispenser 10 shown in FIG. 1 also stores a plurality of node assemblies 13 (of which only one can be seen in the perspective of FIG. 1), where each node assembly 13 comprises a multifaceted nodal element 14 with a plurality of elongate lugs 15 projecting therefrom. In principle, however, the strut dispenser 10 could be configured to store any number of node assemblies 13.

The strut dispenser 10 can be secured in a conventional manner to a support mechanism (not shown in FIG. 1), which can be extended or deployed from a vehicle such as a NASA space shuttle in the vicinity of a "building site" in extraterrestrial space where the struts 11 and 12 and the node assemblies 13 are to be connected together according to a predetermined plan in order to erect a truss structure. Connection of the struts 11 and 12 to the node assemblies 13 is accomplished using quick-connecting coupling fixtures of the type disclosed in U.S. Pat. No. 4,679,961 which are attached to the ends of the struts 11 and 12. It is contemplated that the support mechanism for the strut dispenser 10 could comprise a rail or track along which the strut dispenser 10 would be moved to various positions as required by an astronaut to facilitate his task of erecting the truss structure.

As shown in FIG. 1, the strut dispenser 10 comprises a frame to which a platform 16 is secured to provide a place for the astronaut to stand while removing the struts 11 and 12 and the node assemblies 13 from the strut dispenser 10, and while connecting them to form the truss structure. A pair of rigid straps 17 is secured to the platform 16 to receive the astronaut's feet, thereby anchoring him to the strut dispenser 10 while he is working to assemble the struts 11 and 12 and the node assemblies 13. Also, a brace 18 comprising a support member 19 and a handlebar 20 is secured to the frame of the strut dispenser 10 to enable the astronaut to control his own twisting motions while removing the struts 11 and 12 and the node assemblies 13 from the strut dispenser 10.

To accommodate the different lengths of the struts 11 and 12, different pairs of strut-retainer assemblies are secured to the frame of the strut dispenser 10. The two members of each particular strut-retainer assembly pair are positioned with respect to each other to enable struts of a particular length to be stored. Thus, as illustrated in FIG. 1, the members of the pair comprising the strut-retainer assemblies 22 and 23 are positioned with respect to each other to store the shorter-length struts 11, and the members of the pair comprising the strut-retainer assemblies 22' and 23' are positioned with respect to each other to store the longer-length struts 12. (Most of the strut-retainer assembly 22' is blocked from view by the astronaut's body in the perspective of FIG. 1.)

The strut-retainer assemblies 22 and 22' are secured to the frame of the strut dispenser 10 within easy reach of the astronaut when he is standing on the platform 16. The strut-retainer assemblies 23 and 23' are secured to the frame of the strut dispenser 10 at different locations corresponding to the different lengths of the struts 11 and 12, respectively, and (depending upon the lengths of the struts 11 and 12) are generally out of reach of the astronaut standing on the platform 16. In substantial particulars with respect to the concept of the present invention, the strut-retainer assembly 22' W can be identical to the strut-retainer assembly 22, and the strut-retainer assembly 23' can be identical to the strut-retainer assembly 23.

The node assemblies 13 are secured to the strut-retainer assemblies 22 and 22' within reach of the astronaut standing on the platform 16. In the prototype embodiment of the invention, spring clamps of conventional design (not visible in the perspective of FIG. 1) were attached to each of the strut-retainer assemblies 22 and 22' to grip one of the lugs 15 projecting from the nodal element 14 of a corresponding one of the node assemblies 13.

Figures 2, 3, 4:
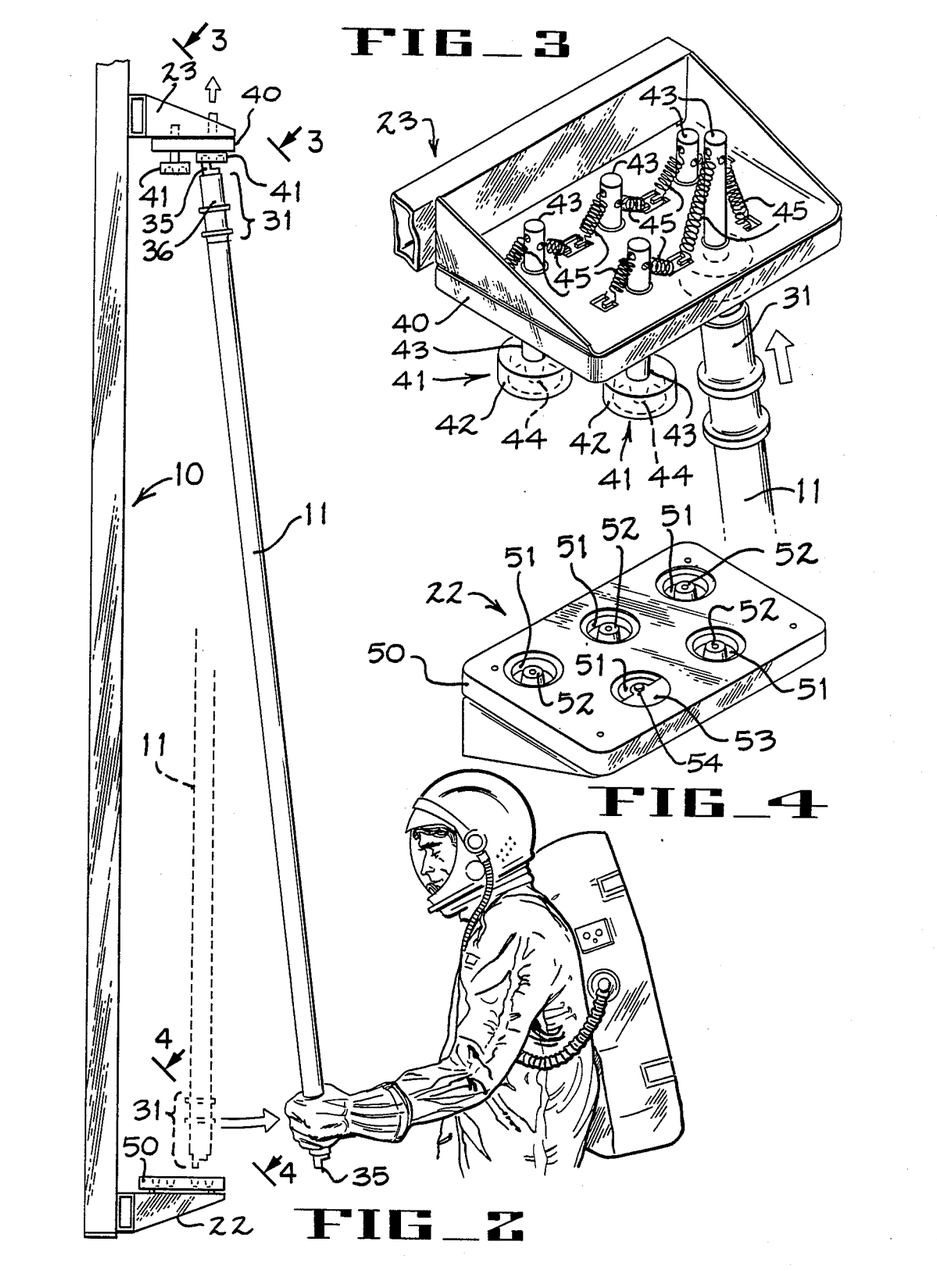
FIG. 2 is an enlarged side view of a portion of the strut dispenser of FIG. 1 in which a strut is shown being removed from the dispenser.
FIG. 3 is a view from the perspective of line 3—3 in FIG. 2 showing a strut-retainer assembly comprising a plurality of spring-loaded receptacles remote from the work station of an astronaut standing on a platform attached to the strut dispenser.
FIG. 4 is a view from the perspective of line 4—4 in FIG. 2 showing a strut-retainer assembly located within reach of the astronaut's work station.

Referring to FIG. 2, coupling fixtures 31 generally of the type disclosed in U.S. Pat. No. 4,679,961 are shown attached to opposite ends of each strut 11. Each coupling fixture 31 comprises a solid circularly cylindrical member 35 surrounded by a hollow circularly cylindrical sleeve 36. A proximal end of the cylindrical member 35 is secured to one end of the strut 11 (in a manner that may be conventional) so that the cylindrical member 35 extends coaxially with respect to the strut 11. A distal end of the cylindrical member 35 is hemicylindrically configured with an inner surface that is contoured to receive a correspondingly configured disc-like knob 150 at the distal end of one of the lugs 15.

The disc-like knob 150 at the distal end of each elongate lug 15 is symmetric about the longitudinal axis of the lug 15, as described in U.S. Pat. No. 4,679,961. Thus, the distal end of the cylindrical member 35 secured to one end of the strut 11 can be maneuvered by the astronaut so as to approach the distal end of the corresponding lug 15 of the appropriate node assembly 13 from any convenient angle in order to make overlapping side contact therewith. The knob 150 at the distal end of the lug 15 is received in mating engagement by the correspondingly configured inner surface of the distal end of the cylindrical member 35, whereupon the sleeve 36 is slid by the astronaut longitudinally over the distal ends of both the cylindrical member 35 and the lug 15 to achieve a secure coupling therebetween.

In practicing the present invention in extraterrestrial space, the astronaut, while standing on the platform 16 with his feet anchored thereto by the straps 17, commences erection of the truss structure by removing a selected one of the node assemblies 13 and a selected one of the struts 11 from the dispenser 10. The technique whereby the selected strut 11 is removed from the dispenser 10 requires the use of only one hand. Thus, to remove the strut 11 from the dispenser 10, the astronaut grasps the coupling fixture 31 attached to the end of the strut 11 within reach of his work station (i.e., adjacent the strut-retainer assembly 22) with one hand. Then, with this one-hand grip, the astronaut moves the strut 11 longitudinally in the direction of the remote strut-retainer assembly 23. A spring-loaded receptacle (described hereinafter), which holds the distal end of the cylindrical member 35 of the coupling fixture 31 attached to the opposite end of the strut 11, exerts a restoring force that must be overcome by the astronaut when moving the strut 11 toward the remote strut-retainer assembly 23. The coupling fixture 31 attached to the end of the strut 11 within reach of the astronaut's work station (i.e., the coupling fixture 31 in the astronaut's grip) is thereby lifted out of the strut-retainer assembly 22. After the coupling fixture 31 in the astronaut's grip has been lifted clear of the strut-retainer assembly 22, the astronaut pivots the strut 11 about the spring-loaded receptacle away from the dispenser 10 and then, with the same one-hand grip, pulls the strut 11 so that the coupling fixture 31 attached to the opposite end of the strut 11 is removed from the spring-loaded receptacle.

After the ends of the strut 11 have been removed from the strut-retainer assemblies 22 and 23, respectively, the astronaut then maneuvers the strut 11 with the same one-hand grip so that the hemicylindrical distal end of the cylindrical member 35 of the coupling fixture 31 in his grip is brought into overlapping side contact with the distal end of the corresponding lug 15 of the appropriate node assembly 13. After overlapping side contact has been made between the distal ends of the cylindrical member 35 and the lug 15, the astronaut then slides the cylindrical sleeve 36 longitudinally over the cylindrical member 35 from an OPEN position (as shown in FIG. 2) to a LOCKED position (not shown). In the LOCKED position, the cylindrical sleeve 36 surrounds the overlapping distal ends of the cylindrical member 35 and the lug 15, and thereby provides the secure coupling as described in detail in U.S. Pat. No. 4,679,961.

The remote strut-retainer assembly 23 comprises a plate 40, which supports a plurality of spring-loaded receptacles 41. Each receptacle 41 is configured to receive the distal end of the cylindrical member 35 of a corresponding one of the coupling fixtures 31 attached to one end of one of the struts 11. As illustrated in FIG. 3, each receptacle 41 has a cup portion 42 and a stem portion 43. The cup portion 42 of each receptacle 41 has a circularly cylindrical side wall and a closed end wall, which define a volume in which the distal end of the cylindrical member 35 is received. The stem portion 43 of each receptacle 41 is circularly cylindrical, and extends outwardly from the closed end wall thereof. The stem portion 43 is coaxial with respect to the cylindrical side wall of the cup portion 42, and has an outside diameter that is smaller than the outside diameter of the cylindrical side wall of the cup portion 42. In the prototype embodiment, the stem portion 43 of the receptacle 41 forms an integral structure with the cup portion 42. However, in principle the stem portion 43 and the cup portion 42 could be separate members joined together to form the receptacle 41. A truncated conical boss 44 extends axially from the closed end wall of the cup portion 42 into the volume provided by the receptacle 41 to receive the distal end of the cylindrical member 35.

Circularly cylindrical bores extend perpendicularly through the plate 40 to receive the stem portions 43 of corresponding spring-loaded receptacles 41. The bores are dimensioned so that the stem portion 43 of each receptacle 41 makes sliding frictional contact with the cylindrical wall of the bore in which it is received. The plate 40 is oriented by the strut-retainer assembly 23 so as to be perpendicular to the struts 11 stored in the dispenser 10.

In the prototype embodiment shown in FIG. 3, spring-loading of each receptacle 41 is accomplished by attaching one end of each member of a pair of helical springs 45 to the stem portion 43 of the receptacle 41, and by attaching the other end of each member of the pair of springs 45 to the plate 40. When the struts 11 are not present in the dispenser 10, each of the receptacles 41 is caused by the springs 45 attached thereto to assume a predetermined neutral position (i.e., a position of minimum potential energy), which is substantially the same with respect to the plate 40 for all of the receptacles 41. The springs 45 attached to the stem portion 43 of the receptacle 41 are stretched when the receptacle 41 is pushed away from its neutral position, which occurs when the stem portion 43 slides within the corresponding bore through the plate 40. Stretching of the springs 45 results when the astronaut moves the strut 11 by lifting the distal end of the cylindrical member 35 of the coupling fixture 31 attached to the end of the strut 11 within reach of his work station away from the strut-retainer assembly 22.

The strut-retainer assembly 22 within reach of the astronaut's work station comprises a plate 50, which likewise has an orientation perpendicular to the struts 11 stored in the dispenser 10. As shown in FIG. 4, cylindrical recesses 51 are formed on a surface of the plate 50 facing toward the plate 40. The recesses 51, like the cup portions 42 of the receptacles 41, are configured to receive the distal ends of the cylindrical members 35 of the coupling fixtures 31 attached to the ends of the struts 11. Each recess 51 has a circularly cylindrical side wall and a bottom wall, which define a volume in which the distal end of the cylindrical member 35 is received. A truncated conical boss 52 extends axially from the bottom wall of the recess 51 into the volume provided to receive the distal end of the cylindrical member 35.

To place one of the struts 11 into the dispenser 10 for storage, the distal end of the cylindrical member 35 of the coupling fixture 31 attached to one end of the strut 11 is inserted into the cup portion 42 of one of the receptacles 41 of the strut-retainer assembly 23 remote from the astronaut's work station. The boss 44 within the receptacle 41 makes contact with the inner surface of the hemicylindrically configured distal end of the cylindrical member 35, thereby guiding the strut 11 into almost perpendicular orientation with respect to the plate 40. The strut 11 is then moved longitudinally toward the strut-retainer assembly 23 against the restoring force of the springs 45 connecting the stem portion 43 of the receptacle 41 to the plate 40. The direction in which the strut 11 is moved deviates by only a small angle from perpendicularity with respect to the plate 40, whereby the stem portion 43 of the receptacle 41 is caused to slide within the corresponding bore in the plate 40 so that the strut 11 can be pivoted about the boss 44 in the receptacle 41. The strut 11 is then pivoted about the boss 44 to bring the distal end of the cylindrical member 35 of the coupling fixture 31 attached to the other end of the strut 11 near the astronaut's work station into alignment with a proper one of the recesses 51 in the plate 50 at which the strut 11 is perpendicular with respect to both the plate 40 and the plate 50.

Figure 5:
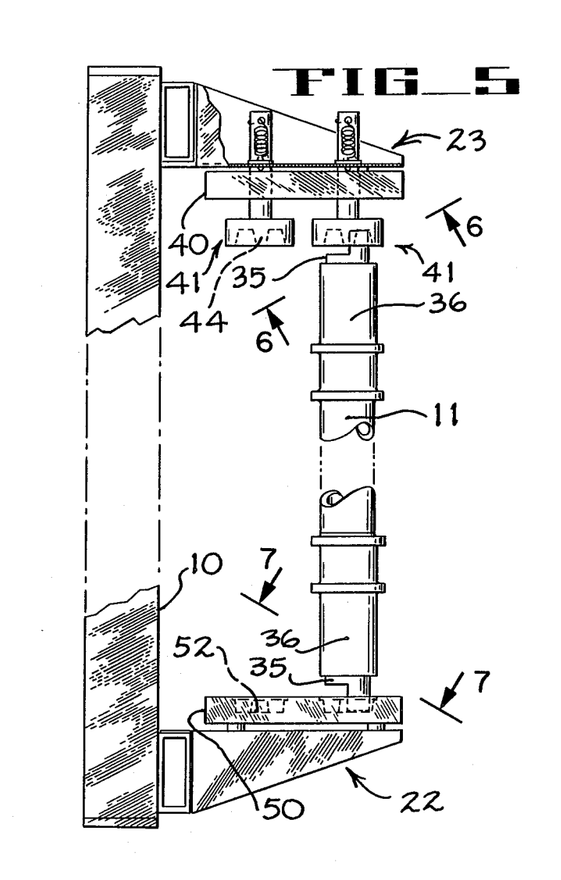
FIG. 5 is a side view of a portion of the strut dispenser of FIG. 1 showing a strut stored in the dispenser.

When the strut 11 has been aligned with the proper recess 51 in the plate 50, the force applied by the astronaut to move the strut 11 toward the remote strut-retainer assembly 23 against the bias of the springs 45 is then released. The springs 45 then urge the receptacle 41 to return to its neutral position, and thereby drive the distal end of the cylindrical member 35 of the coupling fixture 31 attached to the end of the strut 11 near the astronaut's work station into the proper recess 51 in the plate 50. The boss 52 within the recess 51 makes contact with the inner surface of the hemicylindrically configured distal end of the cylindrical member 35, thereby guiding the strut 11 into perpendicular orientation with respect to the plate 50. A view of the strut 11 thereby secured in the dispenser 10 is shown in FIG. 5.

Figure 6:
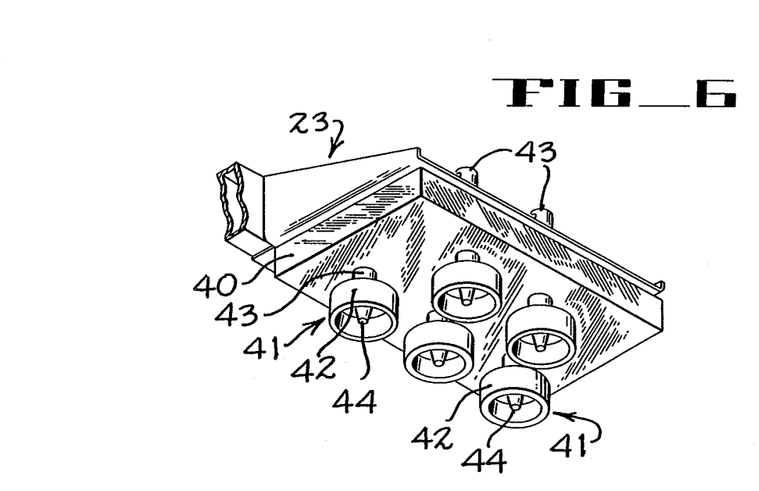
FIG. 6 is a view from the perspective of line 6—6 in FIG. 5 showing the spring-loaded receptacles of the strut-retainer assembly remote from the astronaut's work station.
Figure 7:
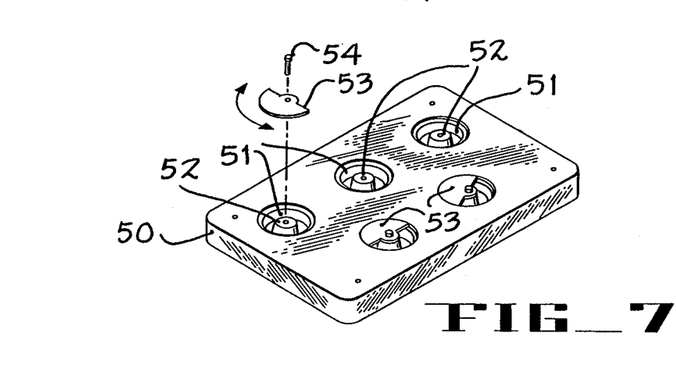
FIG. 7 is a view from the perspective of line 7—7 in FIG. 5 showing receptacles of an alternative type for the strut-retainer assembly remote from astronaut's work station.

A perspective view of the strut-retainer assembly 23 that is remote from the astronaut's work station is shown in FIG. 6 in which the internal configuration of the cup portions 42 of the receptacles 41 is seen. A view of the boss 44 in each receptacle 41 is also seen in FIG. 6. A perspective view of the strut-retainer assembly 22 that is adjacent the astronaut's work station is shown in FIG. 7 in which the internal configuration of the recesses 51 in the plate 50 is seen. A view of the boss 52 in each recess 51 is also seen in FIG. 7.

In erecting a truss structure in extraterrestrial space, the sequence in which the individual struts 11 are to be removed from the dispenser 10 would be specified according to a predetermined construction plan. In order to minimize fatigue suffered by the astronaut in erecting the truss structure, it would be desirable for the astronaut to be able to complete the erection as quickly as possible. Therefore, the individual struts 11 should be stored in the dispenser 10 in such a way that their attached coupling fixtures 31 are oriented so that the astronaut can, with one hand, remove a selected strut 11 and maneuver it to where the hemicylindrical distal end of the cylindrical member 35 of the coupling fixture 31 at one end of the strut 11 is in proper position to make overlapping side contact with the distal end of the corresponding lug 15 on the appropriate node assembly 13.

In accordance with the present invention, each strut 11 is stored in the dispenser 10 with a predetermined rotational orientation, so that there will be no need for the astronaut to rotate the strut 11 about its longitudinal axis in order for the coupling fixture 31 to have the proper orientation for mating with the lug 15. In order to store the individual struts 11 with predetermined rotational orientations in the dispenser 10, semicircular covers 53 are provided over the recesses 51 in the plate 50. Each semicircular cover 53 is supported on the boss 52 extending axially within the corresponding recess 51, and is secured to the boss 52 by a screw 54 that extends along the cylindrical axis of the recess 51. As shown in FIG. 7, each semicircular cover 53 over each corresponding recess 51 has a predetermined rotational orientation, which defines the rotational orientation of the hemicylindrical distal end of the cylindrical member 35 of the coupling fixture 31 attached to the end of the strut 11 within reach of the astronaut's work station.

Figure 8:
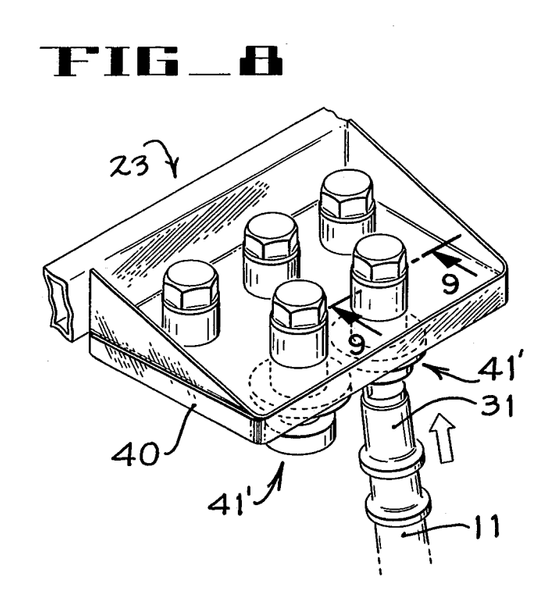
FIG. 8 is a perspective view, as in FIG. 3, showing spring-loaded receptacles of an alternative type for the strut-retainer assembly remote from the astronaut's work station.

In an operational version of the strut dispenser 10 according to the present invention, spring-loading of each receptacle 41 could be accomplished in a manner different from that shown in FIG. 3 for the prototype. An alternative type of spring-loaded receptacle 41' that is contemplated for use in place of the above-described receptacle 41 is illustrated in perspective view in FIG. 8 and in cross-sectional view in FIG. 9.

Figure 9:
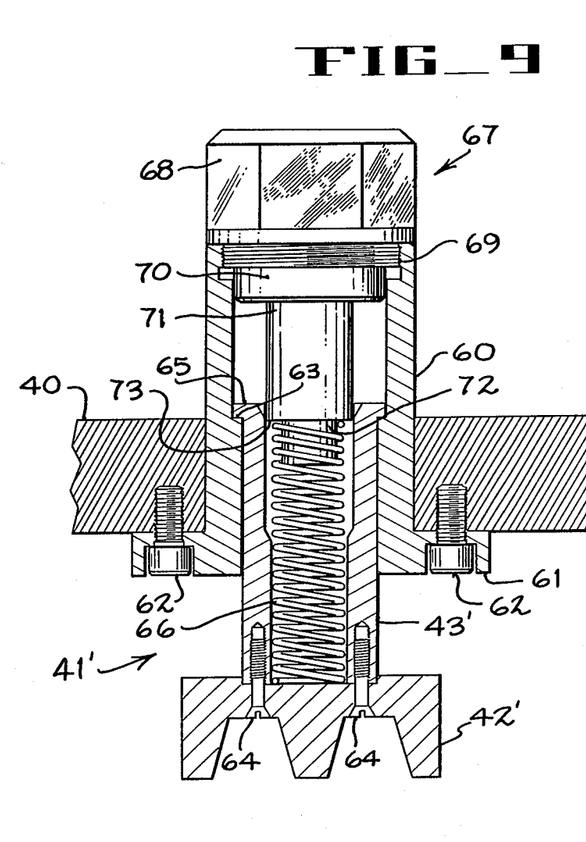
FIG. 9 is a cross-sectional view as seen along line 9—9 in FIG. 8 of the alternative type of spring-loaded receptacle.

As seen in FIG. 9, a cylindrical liner 60 is fitted in each bore through the plate 40 so that a circumferentially flanged end portion 61 of the liner 60 overlaps the side of the plate 40 facing toward the plate 50. The liner 60 is secured to the plate 40 by machine screws 62, which pass through holes in the flanged portion 61 and enter correspondingly aligned screw-threaded holes in the surface portion of the plate 40 around the bore. The other end of the liner 60 extends through the bore beyond the opposite surface of the plate 40 facing away from the plate 50. The portion of the liner 60 within the bore between opposite surfaces of the plate 40 has a smaller internal diameter, and the remaining portion of the liner 60 extending outside the bore beyond the surface of the plate 40 facing away from the plate 50 has a larger internal diameter. There is a sharp transition from the smaller internal diameter to the larger internal diameter of the liner 60 at the plane of the surface of the plate 40. This transition from the smaller internal diameter to the larger internal diameter forms an annular step 63 within the liner 60.

The receptacle 41' comprises a cup member 42' and a stem member 43'. The cup member 42' has substantially the same internal configuration as the cup portion 42 of the receptacle 41 shown in FIG. 3 for the prototype. The stem member 43' is a functional analog of the stem portion 43 of the receptacle 41 of the prototype, but is hollow and internally contains a spring (described hereinafter) instead of being externally connected to the plate 40 by means of springs as was the stem portion 43 of the receptacle 41.

The stem member 43' is of circular cylindrical configuration, and the cup member 42' is secured to one end thereof (i.e., a proximal end extending through the corresponding bore in the plate 40 toward the plate 50). As shown in FIG. 9, the cup member 42' is secured to the proximal end of the stem member 43' by machine screws 64, which pass through holes in the closed end of the cup member 42' and enter correspondingly aligned longitudinally extending screw-threaded holes positioned on the proximal end of the stem member 43'. The other end of the stem member 43' (i.e., a distal end) has a flanged portion 65, which overlaps the annular step 63 within the liner 60.

The stem member 43' has an external diameter dimensioned so that sliding frictional contact is made between the stem member 43' and the interior cylindrical wall of the portion of the liner 60 within the bore between the opposite surfaces of the plate 40. The flanged portion 65 of the stem member 43' extends laterally outward to make sliding frictional contact with the interior cylindrical wall of the remaining portion of the liner 60 extending outside the bore beyond the surface of the plate 40 facing away from the plate 50. Contact of the flanged portion 65 of the stem member 43' with the annular step 63 inside the liner 60 limits the travel of the stem member 43', and thereby prevents the receptacle 41' from leaving the liner 60.

A helical spring 66 is disposed coaxially within the hollow stem member 43'. One end of the spring 66 abuts the outside surface of the closed end wall of the cup member 42', and the other end of the spring 66 extends toward the flanged end of the stem member 43' to a position that is approximately co-planar with the annular step 63. The end of the liner 60 projecting outside the bore through the plate 40 in a direction away from the plate 50 is screw-threaded, and a correspondingly screw-threaded bolt 67 is received therein. The bolt 67 has a head portion 68, and four successive circularly cylindrical shank portions of progressively smaller diameter extending from the head portion 68. The head portion 68 is hexagonally cylindrical in the preferred embodiment to facilitate engagement thereof by a conventional wrench. A first shank portion 69 of the bolt 67 is screw-thread, and has a diameter dimensioned to engage the screw-threaded end of the liner 60. A second shank portion 70 of the bolt 67 has a smaller diameter, which is dimensioned to fit with frictional contact within the portion of the liner 60 extending outside the bore of the plate 40. A third shank portion 71 of the bolt 67 has an even smaller diameter, which is dimensioned to fit with frictional contact within the hollow stem member 43'. A fourth shank portion 72 of the bolt 67 has the smallest diameter, which is dimensioned to fit longitudinally within the helical spring 66. A step-like transition between the third shank portion 71 and the fourth shank portion 72 provides an annular step 73 against which the end of the spring 66 that is co-planar with the step 63 abuts.

The bolt 67, and in particular the annular step 73 on the bolt 67, functions as a stopper to prevent motion of the spring 66 outside the liner 60. When a force applied by the astronaut to the strut 11 causes the stem portion 43' of the receptacle 41' to slide longitudinally within the liner 60, the spring 66 becomes compressed. Compression of the spring 66 produces a restoring force, which urges the receptacle 41' to return to an extended (or "neutral"0 ) position as shown in FIG. 9. When the force applied by the astronaut is removed, the restoring force of the spring 66 drives the receptacle 41' back to the extended position shown in FIG. 9.

Figures 10, 11, 12:
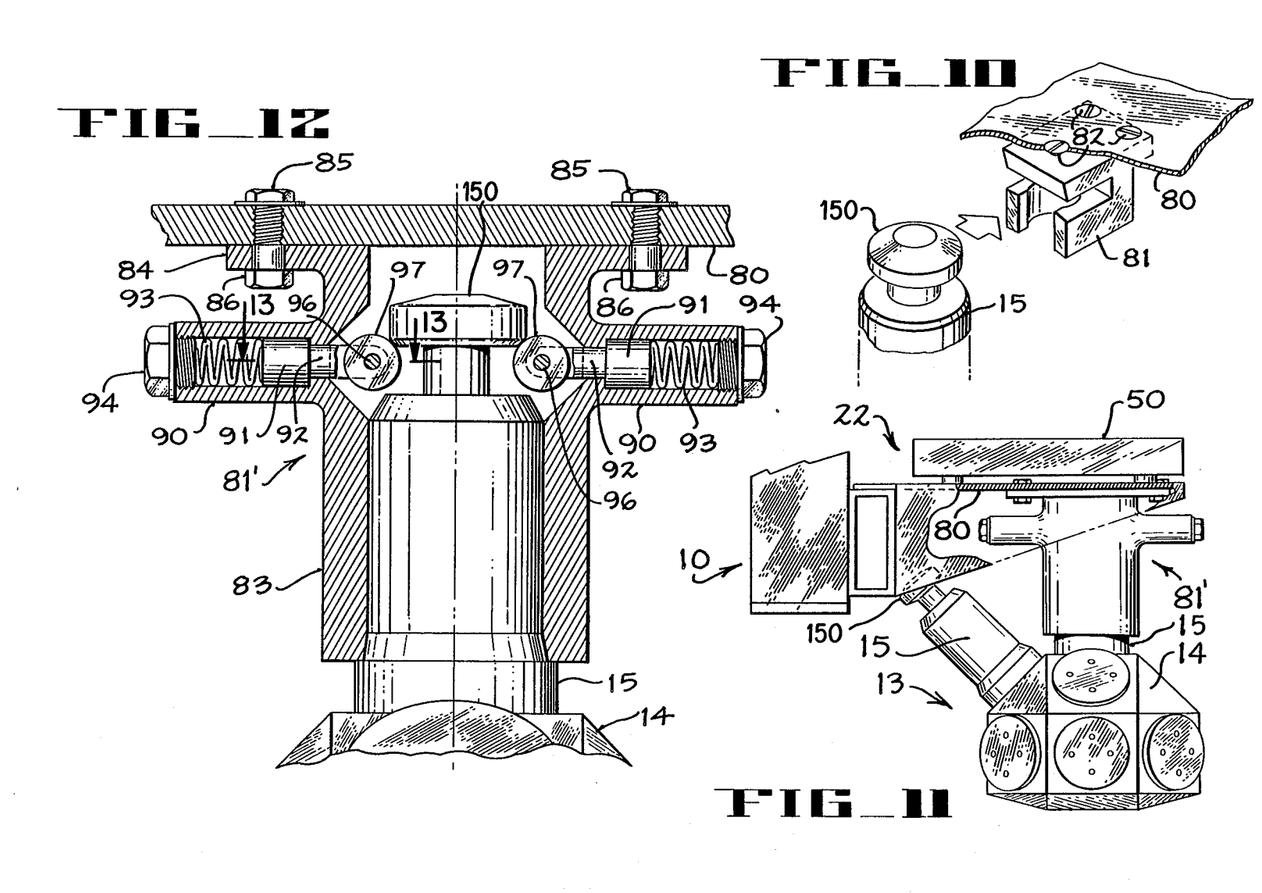
FIG. 10 is a perspective view of a conventional spring clamp secured to the strut-retainer assembly of FIG. 4 for storing a node assembly.
FIG. 11 is a side view of an alternative type of clamp for storing a node assembly.
FIG. 12 is a cross-sectional view of the alternative type of clamp shown in FIG. 11.
Figure 13:
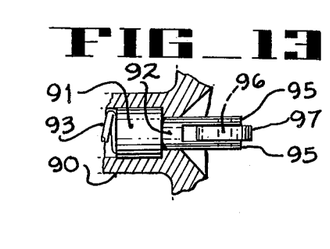
FIG. 13 is a plan view of a fragmentary portion of the alternative type of clamp as seen along line 13—13 in FIG. 12.

In the prototype embodiment, the plate 50 of the strut-retainer assembly 22 located within reach of the astronaut's work station was mounted upon a support plate 80 (not visible in the perspective of FIG. 1). As shown in FIG. 10, a conventional spring clamp 81 was attached by machine screws 82 to a soffit surface of the plate 80 (i.e., to an undersurface thereof facing away from the plate 50) in order to grip the a neck portion of one of the lugs 15 of one of the node assemblies 13. An alternative type of clamp 81', which is contemplated for use in place of the conventional spring clamp 80 in an operational version of the strut dispenser 10, is illustrated in side view in FIG. 11 and in cross-sectional view in FIG. 12.

The clamp 81' comprises a sleeve 83 having a circularly cylindrical interior wall, which defines a volume dimensioned to receive the lug 15 of the node assembly 13. One end of the sleeve 83 has an outwardly flanged portion 84 through which holes are drilled at substantially equiangular intervals. Correspondingly positioned holes are drilled through the support plate 80 in alignment with the holes through the flanged portion 84, and bolts 85 pass through the holes so aligned. Nuts 86 are tightened on the ends of the bolts 85 to secure the sleeve 83 to the support plate 80. Two circularly cylindrical housings 90 are formed integrally with the sleeve 83, and extend in opposite directions from each other along a common axis substantially perpendicular to the cylindrical axis of the sleeve 83. Each housing 90 has a circularly cylindrical interior wall, which defines an interior volume that is in communication with the volume defined by the sleeve 83 for receiving the lug 15.

Fitted into each housing 90 is a circularly cylindrical plug 91, which is dimensioned to make sliding frictional contact with the cylindrical interior wall of the housing 90. A detent member 92 is secured to one end of the other 91 (as by screw-threaded engagement in a bore formed therein) so as to project out of the interior volume of the housing 90 into the volume defined by the sleeve 83. A helical spring 93 is fitted into the housing 90 between the other end of the plug 91 and a flat-ended bolt 94 that is screw-threaded into the distal end of the housing 90. One end of the spring 93 abuts the plug 91, and the other end of the spring 93 abuts the bolt 94. A pair of projecting members 95 extend longitudinally from the detent member 92 into the volume defined by the sleeve 83. The projecting members 95 are parallel to each other, and serve as mountings for opposite ends of an axel 96. A roller wheel 97 is mounted on the axel 96 for rotation in a plane parallel to the projecting members 95.

Each housing 90 is constricted at its proximal end (i.e., the end communicating with the volume defined by the sleeve 83) in order to prevent the cylindrical plug 91 from leaving the housing 90. As shown in FIG. 12, an annular ridge extends inwardly from the cylindrical wall adjacent the proximal end of the housing 90, and a peripheral annular portion of the end of the plug 91 to which the detent member 92 is attached abuts the annular ridge. The roller wheel 97 supported by the projecting members 95 extends into the volume defined by the sleeve 83 so as to make contact with the disc-like knob 150 at the distal end of the lug 15, when the lug 15 is being inserted into the sleeve 83.

When the disc-like knob 150 at the distal end of the lug 15 reaches the roller wheels 97 as the lug 15 is being inserted into the sleeve 83, the knob 150 thereby pushes the roller wheels 97 (and hence also the cylindrical plugs 91) into their respective housings 90 against the biases of the springs 93. In this way, the knob 150 is forced past an obstruction in the sleeve 83 caused by the roller wheels 97. However, after the knob 150 has passed the position of the roller wheels 97, the restoring forces exerted by the springs 93 drive the plugs 91 back to their respective positions at which the detent members 92 (and the projecting members 95 extending therefrom) cause the roller wheels 97 to form the obstruction in the sleeve 83.

When the roller wheels 97 are fully returned to their positions of obstruction in the sleeve 83 after the knob 150 on the distal end of the lug 15 has been forced past the roller wheels 97, the roller wheels 97 then occupy a region adjacent the neck portion of the lug 15 between the knob 150 and an intermediate portion of the lug 15, and thereby obstruct passage of the knob 150 out of the sleeve 83. In this way, the node assembly 13 to which the lug 15 is attached is retained by the sleeve 83. To remove the node assembly 13 from the dispenser 10, the astronaut pulls the node assembly 13 with a sufficient force so that the disc-like knob 150 at the distal end of the lug 15 pushes against the roller wheels 97 so as to cause the plugs 91 to move into their respective housings 90 against the bias of the springs 93 until the roller wheels 97 no longer obstruct passage of the knob 150 out of the sleeve 83.

The present invention has been described above in terms of a prototype and certain alternative embodiments, which were designed for a particular application. However, other embodiments and applications would be apparent to practitioners skilled in the art upon perusal of the foregoing description and the accompanying drawing. Therefore, the description and drawing presented above are to be deemed as illustrative of the invention, which is defined by the following claims and their equivalents.

We claim:

1. An apparatus for dispensing struts to be used by an astronaut for erecting a truss structure in extraterrestrial space, said apparatus comprising:
  (a) a frame:
  (b) means attached to said frame by which the astronaut can anchor himself while erecting said truss structure;
  (c) a first strut-retainer assembly attached to said frame, said first strut-retainer assembly comprising a plurality of spring-loaded receptacles, each of said receptacles being configured to secure a first end of a corresponding one of said struts, each of said receptacles being movable against a spring bias when the astronaut moves said one of said struts longitudinally toward said first strut-retaining assembly; and
  (d) a second strut-retainer assembly attached to said frame, said second strut-retainer assembly having a plurality of recesses, each of said recesses being configured to secure a second end of said corresponding one of said struts, said second strut-retainer assembly being located with respect to said means by which the astronaut can anchor himself so that the astronaut can grip a selected one of said struts adjacent said second end thereof and can thereby move the selected strut longitudinally toward said first strut-retainer assembly, said second end of the selected strut thereby being removed from the corresponding recess in said second strut-retainer assembly, whereby the astronaut can pivot the selected strut about the corresponding receptacle of said first strut-retainer assembly so that, when said second end of the selected strut is clear of said second strut-retainer assembly, said first end of the selected strut can be withdrawn from said first strut-retainer assembly.

2. The apparatus of claim 1 wherein each of said receptacles of said first strut-retainer assembly and each of said recesses of said second strut-retainer assembly is configured to receive a hemicylindrical distal end of a coupling fixture attached to an end of one of said struts.

3. The apparatus of claim 1 wherein said first strut-retainer assembly comprises a plate having a plurality of bores therethrough, each bore corresponding to a particular one of said spring-loaded receptacles, and wherein each of said receptacles comprises a stem portion and a cup portion, the stem portion of each receptacle being positioned in the corresponding one of said bores, the cup portion of each receptacle being configured to receive a fixture attached to an end of one of said struts, the stem portion of each receptacle being movable in the corresponding one of said bores against a restoring force exerted by mechanical spring means when said one of said struts is moved toward said first strut-retaining assembly.

4. The apparatus of claim 3 wherein the stem portion of each of said receptacles is attached to said plate by said spring means.

5. The apparatus of claim 3 wherein the stem portion of each of said receptacles is hollow and contains a helical spring, one end of said spring bearing against said cup portion of said receptacle, the other end of said spring bearing against stopper means for confining said spring within said stem portion, the moving of said selected strut by the astronaut toward said first strut-retainer assembly thereby causing compression of said spring as said stem portion moves in said corresponding one of said bores.

6. The apparatus of claim 1 further comprising clamp means secured to said second strut-retainer assembly, said clamp means being configured to dispense a node assembly to which said strut can be coupled to form said truss structure.

7. An apparatus for dispensing struts and node assemblies to be used by an astronaut for erecting a truss structure in extraterrestrial space, each of said node assemblies comprising a nodal element to which a lug is secured, each end of each strut having a coupling fixture attached thereto, each coupling fixture having a distal end configured for mating engagement with a distal end of the lug secured to one of said nodal elements, said apparatus comprising;
  (a) a frame;
  (b) means attached to said frame by which the astronaut can anchor himself while erecting said truss structure;
  (c) means attached to said frame for dispensing said struts, said strut dispensing means being located with respect to said means by which the astronaut can anchor himself so that the astronaut can grasp the coupling fixture attached to one end of a selected one of said struts while the astronaut is so anchored; and
  (d) clamp means attached to said strut dispensing means, said clamp means being configured to receive said distal end of said lug, said clamp means being located so that the astronaut, while so anchored, can obtain the node assembly comprising said lug and can also move one end of the strut to which said coupling fixture is attached into mating engagement with said distal end of said lug.

8. The apparatus of claim 7 wherein said clamp means comprises a sleeve defining a generally cylindrical interior volume, a first end of said sleeve being attached to said strut dispensing means, a second end of said sleeve being open to receive said distal end of said lug inserted longitudinally therein, said sleeve having a pair of cylindrical housings extending in opposite directions from each other substantially perpendicularly with respect to said cylindrical interior volume defined by said sleeve, said housings communicating with said interior volume defined by said sleeve, a spring and a detent-support means being disposed within each of said housings, a detent extending from said detent-support means into said interior volume defined by said sleeve, said detent-support means being urged by said spring to assume a first position at which a distal end of said detent obstructs passage of said distal end of said lug in said sleeve, said detent-support means being slidable within said housing against a restoring force exerted by said spring so as to move said detent to a second position at which the distal end of said detent permits passage of said distal end of said lug in said sleeve, the detent-support means in each of said housings being caused to slide from said first position to said second position when said distal end of said lug makes contact with said detents as said lug is being inserted into said sleeve, the detent-support means in each of said housings being driven from said second position back to said first position after said distal end of said lug has passed the detents, whereby the detents retain said lug in said sleeve.

9. The apparatus of claim 8 wherein the distal end of each detent comprises a roller.

10. An internally spring-loaded receptacle for holding an end portion of an elongate item that is to be stored in a dispenser apparatus, said receptacle comprising:
   (a) a cup member internally configured to receive said end portion of said elongate item;
   (b) a stem member secured to said cup member, said stem member being of hollow cylindrical configuration;
   (c) a spring positioned within said stem member so that a first end of said spring bears against said cup member; and
   (d) means attached to said dispenser apparatus for:
      (i) orienting said stem member so that said stem member and said elongate item are elongate along a substantially common axis when said elongate item is being stored in said dispenser apparatus;
      (ii) providing an abutment against which a second end of said spring makes contact; and
      (iii) permitting motion of said stem member along said axis to occur when insertion of said end portion of said elongate item into, or removal of said end portion of said elongate item from, said cup member is required.

11. A clamping apparatus for securing an elongate item having a knob-like distal end to a support structure, said clamping apparatus comprising:
   (a) a sleeve member defining a generally cylindrical interior volume, a first end of said sleeve member being attachable to said support structure, a second end of said sleeve member being open to receive said distal end of said elongate item, said sleeve member having a pair of cylindrical housings extending in opposite directions from each other substantially perpendicularly with respect to said cylindrical interior volume defined by said sleeve member, said housings communicating with said interior volume defined by said sleeve member;
   (b) a pair of springs, one spring being contained in each housing; and
   (c) a pair of detent-support structures, one detent-support structure being contained in each housing, a detent extending from said detent-support structure into said interior volume defined by said sleeve member, said detent-support structure being urged by the spring in said housing to assume a first position at which a distal end of said detent obstructs passage of said distal end of said elongate item in said sleeve member, said detent-support structure being slidable within said housing against a restoring force exerted by said spring so as to move said detent to a second position at which the distal end of said detent permits passage of said distal end of said elongate item in said sleeve member, said pair of detent-support structures being caused to slide from said first position to said second position when said knob-like distal end of said elongate item makes contact with said detents as said elongate item is being inserted into said sleeve member, said pair of detent-support structures being driven from said second position back to said first position after said knob-like distal end of said elongate item has passed said detents, whereby said detents retain said elongate item in said sleeve member.

* * * * *